US011900392B2

(12) United States Patent
Tang et al.

(10) Patent No.: US 11,900,392 B2
(45) Date of Patent: Feb. 13, 2024

(54) MOBILE DEVICE WITH IN-PERSON ASSISTANCE

(71) Applicant: Capital One Services, LLC, McLean, VA (US)

(72) Inventors: Qiaochu Tang, The Colony, TX (US); Avid Ghamsari, Frisco, TX (US); Micah Price, Plano, TX (US); Geoffrey Dagley, Mckinney, TX (US); Staevan Alan Duckworth, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 179 days.

(21) Appl. No.: 17/322,052

(22) Filed: May 17, 2021

(65) Prior Publication Data
US 2022/0366426 A1 Nov. 17, 2022

(51) Int. Cl.
G06Q 30/015 (2023.01)
G06Q 30/0601 (2023.01)
G06T 19/00 (2011.01)
G06Q 20/32 (2012.01)
G06T 11/00 (2006.01)
G06Q 40/03 (2023.01)

(52) U.S. Cl.
CPC ....... G06Q 30/015 (2023.01); G06Q 20/3223 (2013.01); G06Q 20/3224 (2013.01); G06Q 30/0643 (2013.01); G06Q 40/03 (2023.01); G06T 11/00 (2013.01); G06T 19/006 (2013.01)

(58) Field of Classification Search
CPC ............ G06Q 30/015; G06Q 20/3223; G06Q 20/3224; G06Q 30/0643; G06Q 40/03; G06Q 30/016; G06T 11/00; G06T 19/006; H04W 4/023; H04W 4/029
See application file for complete search history.

(56) References Cited

U.S. PATENT DOCUMENTS

| 10,235,602 | B1 | 3/2019 | Vasisht et al. |
| 10,515,401 | B1 | 12/2019 | Unnikrishnan et al. |
| 10,810,645 | B2 | 10/2020 | Koo |
| 10,810,654 | B1* | 10/2020 | Robertson ............ G06F 16/258 |
| 2013/0254304 | A1* | 9/2013 | Van Nest ............... H04W 4/029 709/206 |
| 2013/0297460 | A1* | 11/2013 | Spivack ............. G06Q 30/0643 705/27.2 |
| 2014/0156505 | A1* | 6/2014 | Warshawsky ...... G06Q 20/3223 705/39 |
| 2014/0164188 | A1* | 6/2014 | Zabawa ............. G06Q 30/0625 705/26.62 |
| 2019/0158547 | A1* | 5/2019 | Fink .................... H04L 65/1069 |
| 2019/0369742 | A1* | 12/2019 | Ghazanfari ........... G06T 19/003 |
| 2020/0159387 | A1* | 5/2020 | Schoenfelder ....... G06Q 50/163 |

(Continued)

Primary Examiner — Alexandru Cirnu
(74) Attorney, Agent, or Firm — Sterne, Kessler, Goldstein & Fox P.L.L.C.

(57) ABSTRACT

Disclosed herein are system, method, and computer program product embodiments for requesting in-person assistance with a purchase during a mobile device digital interaction (e.g., augmented reality) with a physical object of interest. Display of a real-time view includes the physical object image as well as interfaces for interacting with the image of the physical object. The interfaces include requesting in-person purchase assistance based on a mobile device location proximate to the physical object of interest.

20 Claims, 11 Drawing Sheets

(56) References Cited

U.S. PATENT DOCUMENTS

2020/0342521 A1   10/2020  Tang et al.
2020/0372574 A1   11/2020  Sundaram et al.
2023/0093331 A1*   3/2023  Jepperson .......... G06Q 30/0633

* cited by examiner

MOBILE DEVICE WITH IN-PERSON ASSISTANCE

CROSS-REFERENCE TO RELATED APPLICATIONS AND INCORPORATION BY REFERENCE

This application incorporates, by reference, U.S. Pat. No. 10,235,602, issued Mar. 19, 2019, entitled "Machine Learning Artificial Intelligence System for Identifying Vehicles" and US published application US 2020/0372574, filed May 22, 2020, entitled "Multi-lender Platform that Securely Stores Proprietary information for Pre-qualifying an Applicant", in their entirety.

BACKGROUND

Privacy while shopping remains an important issue for users of mobile devices. A number of techniques currently exist to enable users to securely shop on websites, such as those that store/process data on cloud-storage platforms. However, lagging behind are improvements to hybrid systems where, during an online shopping experience, a user can request in-person assistance for a purchase while using a mobile device over a network.

BRIEF DESCRIPTION OF THE DRAWINGS/FIGURES

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
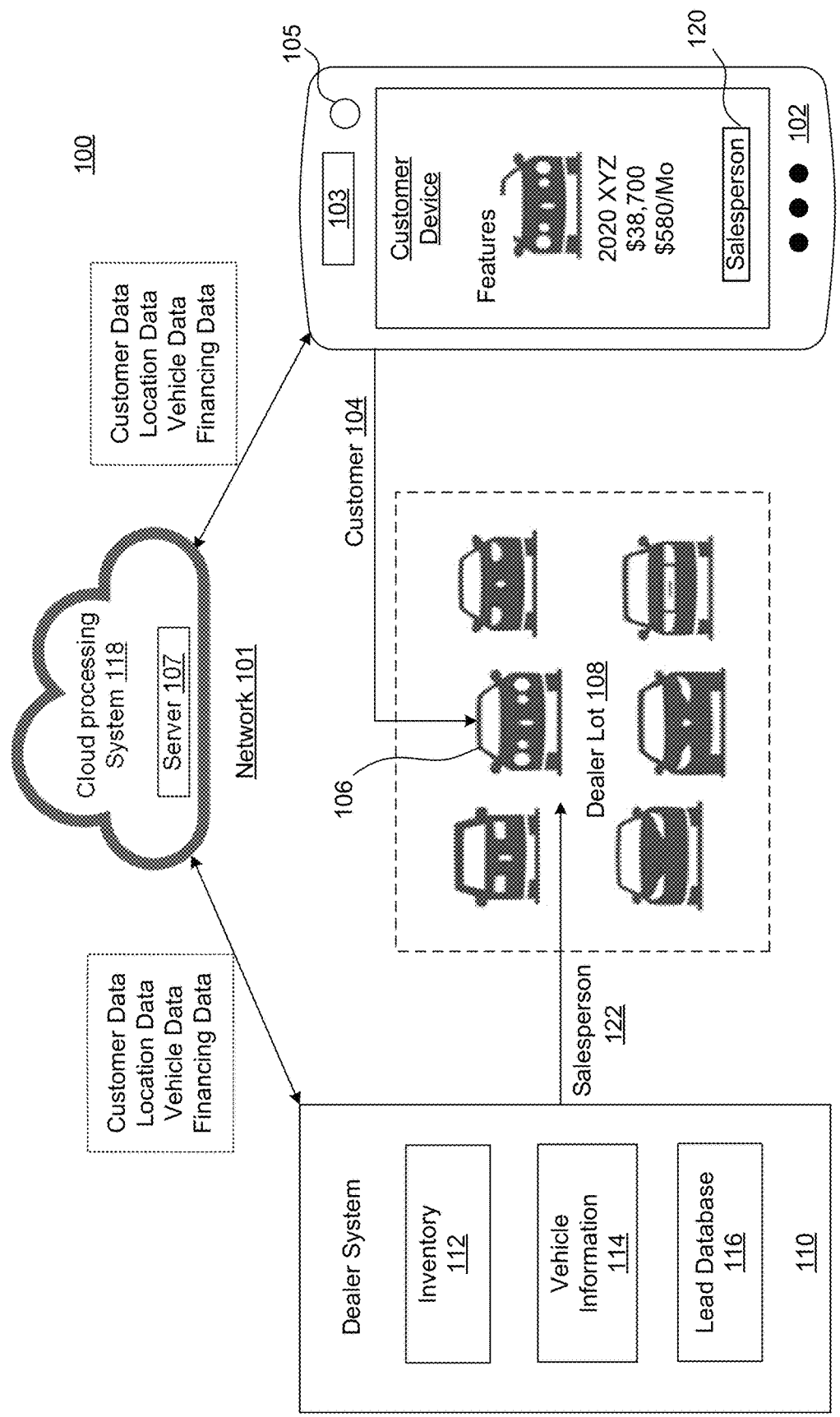
FIG. 1 depicts a block diagram of a system for implementing in-person customer assistance using a mobile device, according to some embodiments.

Provided herein are system, apparatus, device, method and/or computer program product embodiments, and/or combinations and sub-combinations thereof, for requesting during an electronic shopping process, in-person sales assistance from on-premises salespersons using a mobile device. For example, a customer's interaction, in an augmented reality (AR) environment, with a physical vehicle on a dealership lot is used at least, in part, as a mechanism to summon a salesperson. This technology allows a customer to browse cars on a dealership's lot while empowering the customer to control initiation of engagement with a salesperson, to avoid premature engagement by car salespersons, for example, and/or to improve through the sharing of information the salesperson's readiness to assist the customer as the customer desires. The customer requests an in-person salesperson interaction through the mobile device allowing for a no-maintenance (on the part of the dealership) mechanism for summoning a salesperson and with a higher likelihood of success. While example embodiments described herein are directed to a vehicle purchase, the system and processes can be applied to any in-person assistance environment.

Existing mechanisms for summoning staff at various service-oriented locations typically focus on hardware implementations such as buttons or switches. These implementations are inferior to the mechanism described herein due to the inherent maintenance and repair required for physical mechanisms. A digital experience on the mobile device, such as AR, requires no maintenance on part of the seller and will be more reliable versus physical switches, buttons, or scanners.

Even solutions that allow customers to utilize some kind of QR or barcode scanning run into issues due to various lighting conditions and additional overhead costs during the onboarding of the vehicle. Scannable codes may not have batteries, but the ink they are printed with may fade overtime and cars may also be incorrectly labeled. Both of these issues are not applicable to AR scanning.

In one example embodiment, during an AR car shopping experience where customers point their phones at a car in order to get information about the car, the display includes at least a graphic to request additional in-person assistance to consider a purchase of a selected vehicle. The phone uses an image classifier along with geo-location (geographic location) sensor data and geo-fencing (virtual perimeter) to figure out, through the process of elimination, the digital record of the car being viewed during the AR session. From this digital record, the customer can be prequalified for this selected vehicle with the precise financing terms for the customer to consider. In addition, the AR session can display additional information about the vehicle such as a historical accident or a maintenance report and an options list.

In one example embodiment, during an AR car shopping experience, once a successful scan has been completed, the customer has the option of, inside the AR session, tapping a button or making a gesture that notifies remote cloud-based platforms (e.g., webservers) that the customer is ready to talk to a salesperson. The phone sends personal and location information about the customer and the vehicle selected in during the digital experience to the webserver. The webserver relays that information to dealership salespersons through their respective lead platforms, where the sales staff at the dealership may be promptly dispatched to the location to meet with the customer and potentially finalize a deal (purchase/financing) or provide other targeted assistance to the customer.

In some embodiments, the user may be able to control the information shared or the type of assistance desired, for example, maybe they are ready to sit down and close the deal, that's helpful to communicate, but maybe they want to do a test drive first—that would be helpful to know too, so the salesperson can meet the customer at the car with the keys in hand. Maybe they have questions about similar vehicles with other options, etc. Therefore, some additional context or metadata may be provided to the salesperson in the summoning. In one example, pre-generated situational options (e.g., test drive, options, other cars of interest, etc.) are provided on the interface. In another example, intelligent options are provided on the interface based on the user's activity so far (e.g., dwell time, time spent at multiple vehicles, application for financing, etc.).

AR examples include an image object such as a physical (actual) object (e.g., vehicle on dealer's storage lot) that is displayed via a real-time view or an augmented object that is added to the real-time view. This process includes displaying the real-time view of the image object, creating a storage location associated with the image object, and using information associated with the image object to securely store the file, either locally on the mobile device or over a network (e.g., at a cloud-based location) using the mobile device. The information associated with the image object may include information about the physical object such as location information associated with the physical object and/or the mobile device and object information associated with the physical object or information about the augmented object such as spatial relationship of the augmented object to other image objects in the real-time view.

These techniques leverage improvements to technology in mobile devices, such as, more sophisticated cameras, advancing imaging software, and powerful processors, to provide a novel way for purchasing items using a mobile device without bothering a potential customer until they are ready. Many car buyers will go to extreme lengths to avoid sales staff. Many customers visit dealerships at night in order to browse the cars on the lot without being approached by sales staff.

In addition, car buying is a multi-phased process that can take months before a customer is ready to purchase a vehicle. Not all customers walking onto a dealership are ready to purchase a car that day. Salespersons who spend time with these customers either find themselves pressuring the customer for a sale or simply wasting time trying to sell a car to a customer who is not ready to buy. This technology, as described herein, better optimizes a dealership's sales staff while simultaneously reducing the stress levels of customers who are not ready to purchase a car and simply want to browse the dealership lot by giving the customer the power to signal for a sales associate to approach. In some embodiments, the interface is part of an augmented reality application that overlays or superimposes selectable storage options over the image objects that are displayed via the interface.

In view of the foregoing description and as will be further described below, the disclosed embodiments allow in-person assistance during a shopping experience associated with an image object displayed in a real-time view of an interface of a mobile device. In this manner, the described embodiments result in a novel mechanism for shopping through a mobile device.

Various embodiments of these features will now be discussed with respect to the corresponding figures.

FIG. 1 depicts a block diagram of a system 100 for implementing image oriented shopping using image objects in a real-time image, according to some embodiments. System 100 may include a customer 104 interacting with a mobile device 102 interacting with cloud processing system 118, dealer system 110 (server), and vehicle 106. Mobile device 102 may be connected to the cloud processing system 118 or car dealer's system (e.g., server platform) 110 through wired or wireless communication networks 101.

While shown as separate from cloud processing system 118, dealer system 110 can be implemented in one or more servers 107 located in the cloud processing system 118 or by located locally at a dealership or remote dealership server network. Dealer System 110 may include one or more servers or databases such as an inventory database 112, storing existing vehicle inventory as identified, for example, by a vehicle ID. Vehicle information database 114 may store specific vehicle information (pricing, features, options, color, specifications (e.g., drivetrain information, horsepower, torque, length, width, height, etc.) associated with a vehicle ID in the existing inventory. Lead database 116 takes in leads from various sources such as the internet, social media, and third-party apps and provides the leads to salespersons within a dealership.

Mobile device 102 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, augmented reality headsets, interactive heads-up display (HUD), etc.), or a similar type of device. In some embodiments, mobile device 102 may include a location sensor 103 used for tracking a location of mobile device 102. Examples of location sensors 103 include any combination of a global position system (GPS) sensor, a digital compass, a IR distance measurement element, LIDAR distance measuring element, cameras with associated camera position solving software, velocitimeter (velocity meter), an accelerometer or any known or future location systems.

Location sensor 103 may work in combination with image application and image capture device 105 (e.g., camera (front and/or back)) to provide location information associated with objects detected by an image application and image capture device 105. Location sensor 103 may provide location information of mobile device 102, which may be used as a proxy for the physical location of objects (e.g., vehicles in a car dealer storage lot 108) detected by the image application and image capture device 105. For example, if mobile device 102 is utilized at a certain location (for example, based on longitude and latitude coordinates as provided by location sensor 103), any objects that are detected at that certain location (e.g., by an image application and image capture device 105) are associated with that location of mobile device 102 by linking the detected object with coordinates of mobile device 102 at the time the object is detected. In an embodiment where location sensor 103 is implemented as a GPS sensor, the image application may query location sensor 103 for GPS coordinates to the image application at the time the real-time view is displayed and any objects are detected within the real-time view. In an alternative embodiment, described in greater detail hereafter, car dealer inventory management systems may assist in identifying a selected vehicle in the real time AR interaction and subsequent location. For example, all vehicles of Model N are stored at dealership A, in row 2 of storage lot 2.

Figure 2:
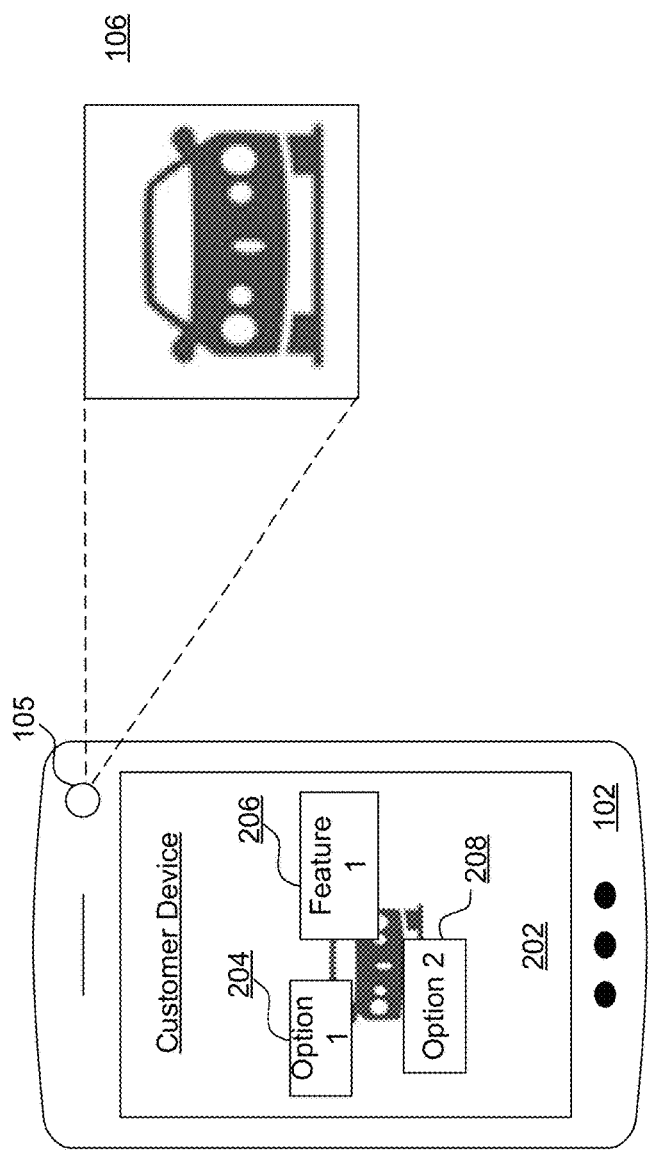
FIG. 2 depicts a block diagram of a mobile device displaying a real-time augmented object in a real time view with an overlay interface including image objects, according to some embodiments.

Mobile device 102 may also include an image application that provides a user an interface for accessing image capture device 105. For example, the image application may be implemented as an augmented reality application that provides an interface for using image capture device 105 to display a real-time view. The image application may also include an interface that allows users to interact with and otherwise select objects displayed in the real-time view provided by image capture device 105. A real-time view refers to a preview or live view that allows the display of mobile device 102 to be used as a viewfinder for taking images. In some embodiments, the real-time view may be implemented as an augmented reality viewer that provides augmented reality interfaces over objects that are displayed within the real-time view (FIG. 2).

In the embodiments described herein, in-person assistance can be requested by interacting with a displayed graphic 120 to request sale assistance on-premises from dealership sales staff (salesperson 122) who meets the customer at the vehicle proximate the mobile device location.

In some embodiments, when interacting with a physical object, the image application may require multiple images and/or a panoramic view of the physical object. Multiple images from different camera views and angles may be required so that subsequent access is not limited to only one camera angle. These multiple images could then be stored as part of the object information.

In some embodiments, object information of augmented objects is utilized by the image application to remember placement of augmented objects within a real-time view. Since augmented objects are "virtual" objects and not physical like physical objects, additional processing is performed by the image application in order to be able to display the augmented objects in the real-time view at a later time. In other words, the image application must remember the placement of the augmented objects within the real-time view so that it can be displayed again during subsequent attempts to access the associated storage location. In order to display an augmented object that has been previously placed, the image application may maintain a database of augmented objects associated with a storage location. The image application may utilize the current location of mobile device 102 to search the database for any augmented objects associated with the current location. If any are found, the image application may retrieve the augmented object(s) and display them in the real-time view in accordance with their respective object information.

In some embodiments, the image application may also include image processing capabilities to remove certain information or features from an image of the object (e.g., taken from the real-time view) to prevent the changes of false positives or negatives when later attempting to access related information. This processing may include removing shadow or lighting information from the object so that they do not factor into the matching process (e.g., vehicle recognition) when performing the comparison between the selected object in the real-time view with the object that is stored in a storage location. For example, if the shadows are included as part of the captured object information, accessing the storage location associated with that vehicle at a later time could require the same shadows to appear in order to provide subsequent identification. To avoid that situation, the image application may remove the shadows from the image and store that processed image of the object as object information for a storage location. In this manner, recognizing the vehicle would not be dependent on the time of day or specific circumstances of the object when the object was originally created.

In some embodiments, the image application may also include an interface for allowing users to drag-and-drop data to the physical object in the real-time view.

In some embodiments, an image capture device 105, such as a camera, includes hardware components for displaying a real-time view of the physical surroundings in which mobile device 102 is used. The image capture device 113 may support one or more image resolutions. In some embodiments, an image resolution may be represented as a number of pixel columns (width) and a number of pixel rows (height), such as 1280×720, 1920×1080, 2592×1458, 3840× 2160, 4128×2322, 5248×2952, 5312×2988, or the like, where higher numbers of pixel columns and higher numbers of pixel rows are associated with higher image resolutions.

In some embodiments, image capture device 105 may be implemented using one or more camera lenses with each lens having different focal lengths or different capabilities. For example, there may be a wide-angle lens (e.g., 18-35 mm), a telephoto (zoom) lens (e.g., 55 mm and above), a lens with a depth sensor, a lens with a monochrome sensor, or a "standard" lens (e.g., 35-55 mm). Determining a depth of field may be calculated using a dedicated lens having a depth sensor or using multiple camera lenses (e.g., telephoto lens in combination with a standard lens).

In some embodiments, the determined distance or depth between image capture device 105 and the object may be used to determine a relative location of the object. The relative location of the object refers to the spatial relationship between the object and surrounding objects, such as image capture device 102. The relative location may be used in combination with the physical location to identify the object.

In some embodiments, image capture device 105 may also be used to detect the contour of objects displayed in the real-time view. Contour information for each object may be stored as object information. Some object information may be available and/or more accurate when image capture device 105 is implemented using more than one camera lens. For example, image capture device 105 implemented with three camera lenses could be more accurate in acquiring depth of field information and determining the exact relative position and contour between different objects. Contour may generally be considered to be three-dimensional information associated with the object.

In one example, the image application may take advantage of the different capabilities of each lens in performing its object detection and analysis. For example, one lens may be configured to recognize the lighting in the real-time view and can distinguish between day and night clearly; an ultra-wide-angle lens can support wide-angle picture shooting and captures additional details regarding objects surrounding the selected object; yet another lens may be a telephoto lens which supports optical zoom to capture specific details regarding the selected object. The image application may then utilize the information provided by each lens of image capture device 105 for not only identifying objects within real-time view but also securely storing and accessing data. In this manner, the image application may be tailored to the capabilities of mobile device 102 while still providing the complete functionality as described in this disclosure.

In some embodiments, when using location information, the current location of mobile device 102 is used as a key for accessing data (e.g., vehicle specific information). For example, when attempting to access vehicle-related information, the current location of the mobile device (e.g., longitude and latitude) may be taken from location sensor 103 and may be used to access object information stored in a storage location.

In some embodiments, the exact location information may be required. In other embodiments, a threshold distance may be used to account for deviation from the exact location. Examples of a threshold distance include a specific distance range (e.g., +/−5 ft.) or a percentage range (e.g., +/−10%) between the current location and the actual location. In an example, the threshold distance between the selected vehicle and mobile device 102 may allow mobile device 102 to be proximate (near) when it is within a certain range (e.g., 5-20 ft.). For example, if mobile device 102 was exactly 15 feet from the vehicle, implementing a threshold distance allows for subsequent access to associated vehicle information associated with this vehicle without requiring the mobile device 102 to be an exact distance from the vehicle.

In some embodiments, object information (e.g., contour, size, color, shape) may also be used when verifying that a selected object matches the object that is associated with the location. For example, when the vehicle information is created, an image of the physical object (e.g., stock photo) is stored as part of the creation process. When subsequent access to the vehicle location is requested, the image application needs to determine that the subsequent access is associated with the same physical object that was used to create the vehicle data. In some embodiments, this may be done via an image comparison between an image of the object that was previously stored and an image of the object that is provided with the request (in real time viewer 202 of mobile device 102). To account for differences in photo conditions (e.g., time of day, shadows, lighting), object information may be used as part of the comparison process in addition to the image processing discussed above. For example, the contour, size, color, and/or shape of the object may be used in combination with the location information in order to increase confidence in matching the objects.

In some embodiments, the image capture device 102 may support a first image resolution that is associated with a quick capture mode, such as a low image resolution for capturing and displaying low-detail preview images on a display of the user device. In some embodiments, the image capture device 102 may support a second image resolution that is associated with a full capture mode, such as a high image resolution for capturing a high-detail image. In some embodiments, the full capture mode may be associated with the highest image resolution supported by the image capture device 102. In some embodiments, mobile device 102 may send the captured image, via the network 101, to a server located in cloud processing system 118 for processing and/or validating the captured image. In some embodiments, mobile device 102 may receive a message or any other type of information from the server, which may be displayed on mobile device 102 via an overlay or interface provided by the image application.

Cloud processing system 118 may include one or more server devices (e.g., a host server, a web server, an application server, etc.), a data center device, or a similar device, capable of communicating with mobile device 102 via network 101. The server may include an image processor, authenticator, image recognizer, object classifier, model generator, and object database. In some embodiments, the server may be implemented as a plurality of servers that function collectively as a cloud database for storing/processing data received from mobile device 102. The plurality of servers can be co-located at a single location (e.g., server farm) or be geographically distributed across multiple locations and/or multiple servers.

In some embodiments, the server may be used to store the vehicle information. Collectively, object processor and authenticator may perform the functions described above for image application including processing the object information, processing requests associated with accessing, uploading, and deleting files, just to name a few examples. Object processor processes object information provided by mobile device 102. Instead of processing object information locally in mobile device 102, mobile device 102 may send the object information to the server to perform the processing remotely. Examples of processing include object detection, OCR, and processing user-selected options such as authentication information and image object processing as discussed above with respect to mobile device 102. Authenticator may be used to authenticate user or location information and encrypt/decrypt data based on information provided by mobile device 102. The object database stores objects and associated information. Like object storage, the object database may differ from conventional storage in that it is configured specifically to store unstructured data associated with objects as a single element.

Network 101 may include one or more wired and/or wireless networks. For example, the network 101 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

FIG. 2 depicts a block diagram of a mobile device 102 displaying a real-time view of objects (e.g., a vehicle image 106 from capture device 105), according to some embodiments. In some embodiments, mobile device 102 represents an implementation of mobile device 102 of FIG. 1 and may include a real-time view 202 (e.g., provided by image application). As noted above, in some embodiments, real-time view provides a preview or live view that allows the display of mobile device 102 to be used as a viewfinder while viewing a vehicle on a dealer's storage lot.

In some embodiments, graphical user interfaces provided by an image application are provided as an overlay (or overlays) within the real-time view. For example, the image application may display a real-time view of a vehicle that includes a number of different objects. The image application may then also display overlay(s) (e.g., a selectable icon) over each of the objects that allow interaction with each object. In this manner, the image application allows for virtual selection/interaction associated with any of the objects that are displayed within the real-time view.

An augmented object is a virtual object that may be selected and placed in a real-time view via user input. The interface may include functions for displaying a menu of available augmented objects, receiving a user selection of an augmented object, and receiving user input for placing the selected augmented object within the real-time view provided by an image application. After placement of the augmented object within the real-time view, image application may store object information associated with the augmented object. Object information may include location information of the augmented object, which may be calculated based on estimated GPS coordinates of the augmented object. Other types of object information may include details of the augmented object and spatial relationship (e.g., estimated distance information) to other image objects shown in the real-time view.

In some embodiments, the image application includes object detection and recognition capability for performing an analysis of the real-time view and automatically detecting object(s) in the real-time view. Detection of objects may include dynamically determining the objects that appear in the real-time view provided by the image application (e.g., whether the object is specific vehicle) and object information associated with the detected object (e.g., spatial relationship of the object with other objects in the image, color, size, image of the object). For example, in some embodiments, the image application also includes optical character recognition (OCR) for detecting written text displayed in the real-time view. In some embodiments, the overlays 204, 206 or 208 may be automatically generated and associated with the objects as part of the object detection process. For example, a real-time view may dynamically display an icon over any detected object as they are detected; in other embodiments, the icons are displayed only upon selection of a storage mode option; in yet another embodiment, the icons are displayed once the user interacts with the display.

To perform object recognition, the image application may capture data from image capture device 105 as images and uses a real-time object recognition function to recognize objects displayed in the real-time view. Examples of a real-time object recognition function may be provided through augmented reality toolkits such as ARToolkit and ARTag. After real-time object recognition is performed, the image application may provide an interface for creating storage locations via the real-time view and object recognition capability. For example, in the real-time view, the image application may dynamically detect objects and display, as an overlay over each object, information about the detected object. The image application may also dynamically generate identifiers based on the object detection to be displayed in the real-time view. In some embodiments, the interface may provide selectable features that include selecting the object, creating a location, selecting data, just to name a few examples. These selectable features enable the storage of a selected file at the storage location based on an interaction with the object in the real-time view of the image application.

In this embodiment, real-time view 202 may provide a view of objects within an image of the car, such as vehicle option 1 (204), vehicle option 2 (208) or feature label 206 (can include description graphical pop-up or overlay). Examples include, but are not limited to, exterior options such as paint color, tire or wheel upgrades, or interior options such as seating options, material choices, or entertainment choices. Real-time view 202 may display, as an overlay over these objects, selectable icons 204, 206 or 208. When displayed as, selectable icons 204-208 may be displayed automatically in real-time view 202 as the physical objects (e.g., tires, wheels, seating, etc.) are detected. Selection of selectable icons 204-208 may result in a menu being presented to a user to upload additional data, associate features with a potential purchase, just to name a few examples.

Figure 3:
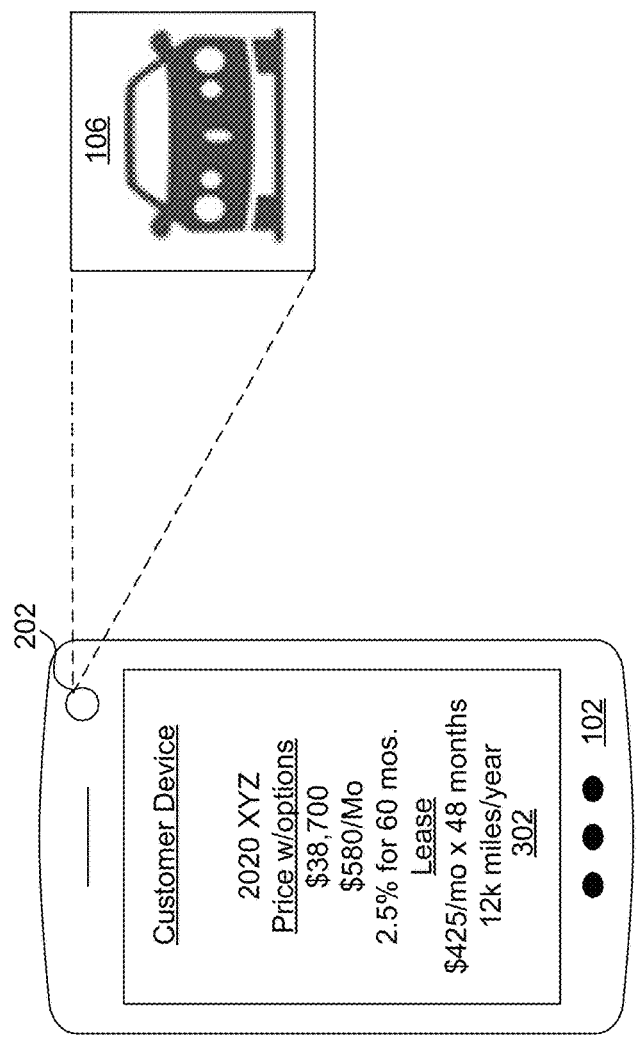
FIG. 3 depicts a block diagram of a mobile device with an interface including image objects, according to some embodiments.

FIG. 3 depicts another block diagram of a mobile device displaying a real-time view with an interface including image objects, according to some embodiments. As a non-limiting example with regards to FIGS. 1 and 2, one or more processes described with respect to FIG. 3 may be performed by a mobile device (e.g., mobile device 102 of FIG. 1) or a server 107 (e.g., part of cloud processing system 118 of FIG. 1) for presenting financial purchase information 302 associated with a physical object that is displayed in a real-time view of the mobile device. In embodiment 300, mobile device 102 and/or servers 107/110 may execute code in memory to perform certain steps associated with FIGS. 5-10. The AR application determines whether the requested data is stored locally (e.g., mobile device memory) or remotely (e.g., cloud-based financial platform).

If stored remotely, a file request (identifying the requested file) and the retrieved location information and object information are retrieved from the remote location for further processing. If stored locally, an image application processes the financial data request based on the location and object information. Financial information, such as customer profile data, prequalification, credit rating, or maximum loan available may be pre-stored in advance of the potential purchase with live information (during AR experience) such as specific vehicle information and dealer incentive programs added to assist in calculating financing options to complete an offer for financing.

Figure 4:
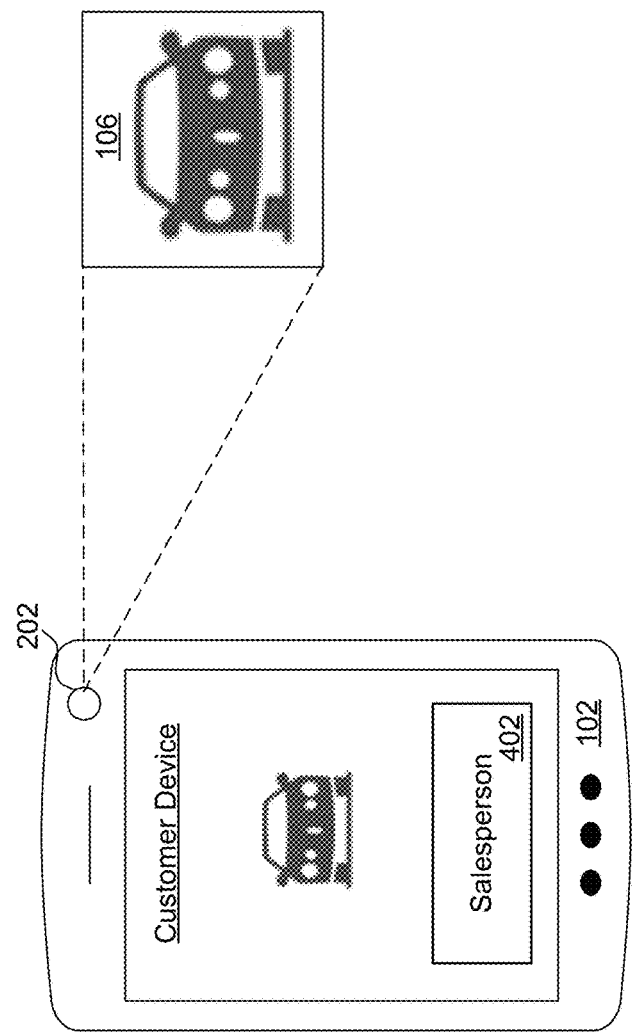
FIG. 4 depicts yet another block diagram of a mobile device displaying image objects including a request for in-person assistance graphic button, according to some embodiments.

FIG. 4 depicts yet another block diagram of a mobile device displaying a real-time view with an interface including image objects, according to some embodiments. As a non-limiting example with regards to FIGS. 1, 2, and 3, one or more processes described with respect to FIG. 4 may be performed by a mobile device (e.g., mobile device 102 of FIG. 1) or a server (e.g., server as part of cloud processing system 118 of FIG. 1) for an in-person request for sales assistance from on-premises staff associated with an image object (e.g., vehicle) that is displayed as a graphical button 402 in a real-time view of the mobile device. When the customer has interacted with the vehicle (AR) to investigate features and options, received financing options associated with that vehicle, they then can request in-person assistance to complete the purchase (e.g., test drive, answers to specific questions, negotiation of price or dealer installed options, etc.). The user can request this in-person assistance at any stage of the shopping process, however, the longer they interact with the vehicle (AR), the more information they and the dealer will have to accelerate the purchase.

In some embodiments, the user may be able to request particular assistance and control the sharing of particular information. For example, the user shares their prequalification information only when they are ready to buy so they can accelerate the closing process. In an example embodiment, the user's interaction with the vehicle may intelligently recommend the sharing options and/or assistance to request.

In some embodiments, the user context and information is displayed in the dealer's leads system to enable the salesperson to provide the customer better service. For example, the leads system may categorize the user based on readiness to buy or readiness to finance, etc. to enable appropriate context for the salesperson.

In these embodiments, mobile device 102 and/or server may execute code in memory to perform certain steps of the methods and processes associated with FIGS. 5-10. While FIG. 4 is described as being performed by mobile device 102 and/or server 107/110, other devices may store the code and therefore may execute by directly executing the code. Accordingly, the discussion of 400 refers to devices of FIGS. 1, 2, and 3 as an exemplary non-limiting embodiment of 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

Figure 5:
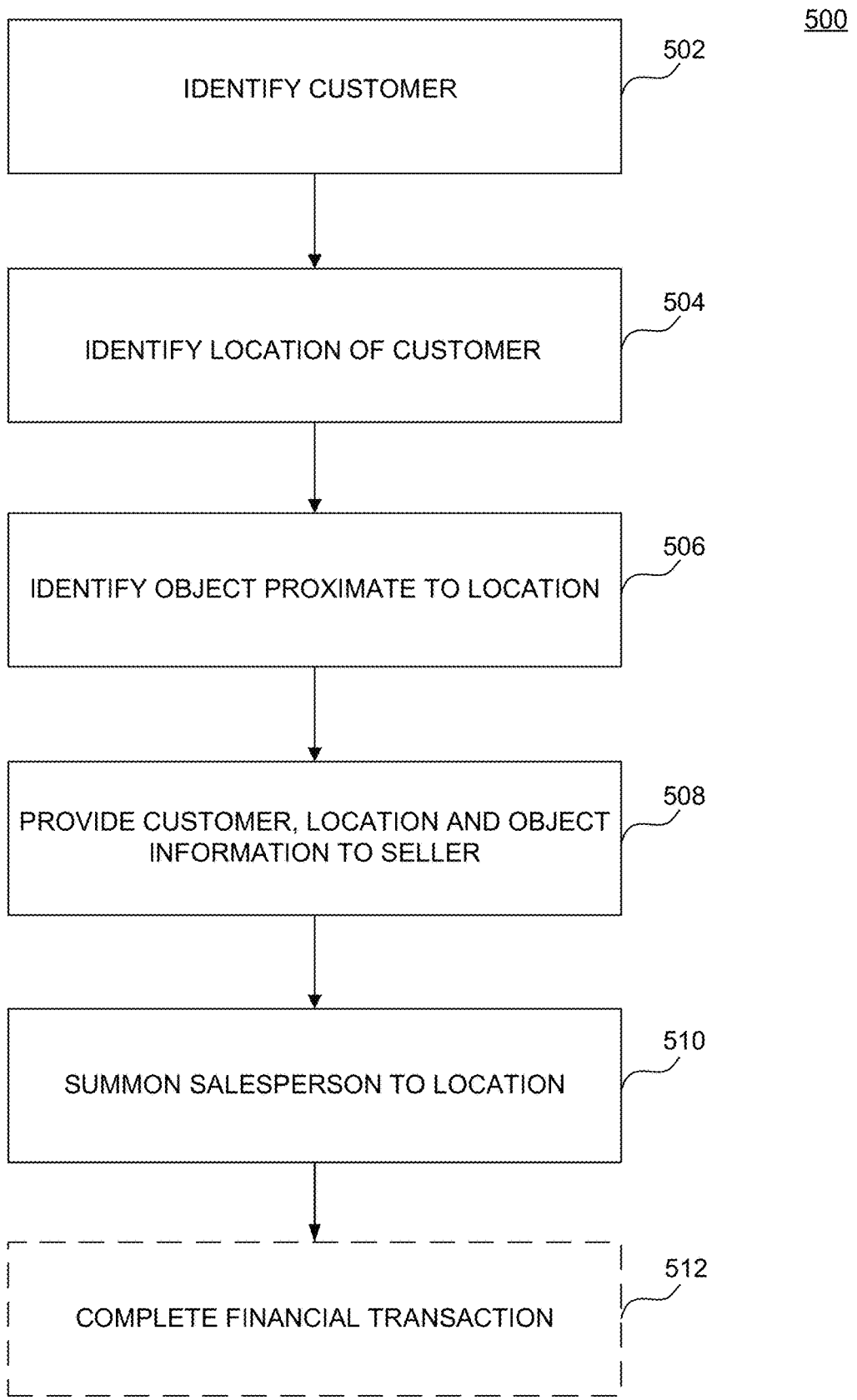
FIG. 5 depicts a flow diagram illustrating a flow of a customer shopping process, according to some embodiments.

FIG. 5 depicts a flow diagram of an example method 500 of an in-person customer assistance process for summoning a salesperson during an augmented reality interaction with a real time view of an augmented object displayed in a real-time view, according to some embodiments. As a non-limiting example with regards to FIGS. 1-4, one or more processes described with respect to FIG. 5 may be performed by a mobile device (e.g., mobile device 102 of FIG. 1) or a server (e.g., server 107/110 of FIG. 1) for storing data in a storage location associated with a physical object that is displayed in a real-time view of the mobile device. In such an embodiment, mobile device 102 and/or server 107/110 may execute code in memory to perform certain steps of method 500 of FIG. 5. While method 500 of FIG. 5 will be discussed below as being performed by mobile device 102 and/or server 107/110, other devices may store the code and therefore may execute method 500 by directly executing the code. Moreover, it is to be appreciated that not all steps may be needed to perform the disclosure provided herein. Further, some of the steps may be performed simultaneously or in a different order than shown in FIG. 5, as will be understood by a person of ordinary skill in the art.

In step 502, a user of a mobile device is identified. For example, login information entered into a communication application or an augmented reality application (app) identifies the user and provides a customer ID to be used by one or more platforms, servers, databases as described in greater detail hereafter to identify the customer. In one embodiment, the customer ID is used to retrieve previously stored customer information (profile) such as identifying information (name, address) or provide a link to previously determined financing information (max loan amount, credit rating, income, etc.).

In step 504, a location of the customer (mobile device) is determined. For example, GPS functionality provided by locator systems of the mobile device (e.g., smartphone) are sent to a customer platform to identify a location of the user by knowing the location of their mobile device.

In step 506, an object selected by the user is identified by a specific location (e.g., GPS), a proximate location (near object of interest) and/or a visual identification application (e.g., image recognition) associated with the mobile device (e.g., smartphone). For example, a vehicle located on a car storage lot (known location) is identified based on a user's mobile device proximity to the vehicle (with 5 feet). In another example, an Augmented Reality (AR) application includes an identification by object detection and recognition programs as well as possible interaction with dealer inventory platforms.

In step 508, a request for in-person assistance is sent (e.g., cellular or wireless communications) from the mobile device to a dealer platform. For example, a user selects a GUI button on the display of the mobile device that requests in-person assistance from a salesperson.

In step 510, the request for in-person assistance, including transaction information, such as, but not limited to, customer information, customer location and object (e.g., vehicle selected) is sent to a cloud-based platform, such as the dealer platform.

Customer information, in some embodiments, is controlled for dissemination by the user. For example, the user may select specific information to be shared or not shared and may control the timing of this sharing. In addition, metadata providing context of the user's situation (ready to buy, test-drive, etc.) may be provided to the dealer's system.

For example, the dealer platform is an on-premises lead generator system viewable by on-site sales staff. A salesperson, receiving the request, receives the transaction information, locates the potential customer on the lot, and thereafter initiates an in-person user assistance phase. The potential customer receives in-person assistance based on the transaction information.

In optional step 512, the transaction information, such as customer information, financing information and object (e.g., vehicle) identification assists in completing a purchase transaction with the mobile device. In an alternate embodiment, the transaction information is used by the dealer to complete the purchase transaction.

Figure 6:
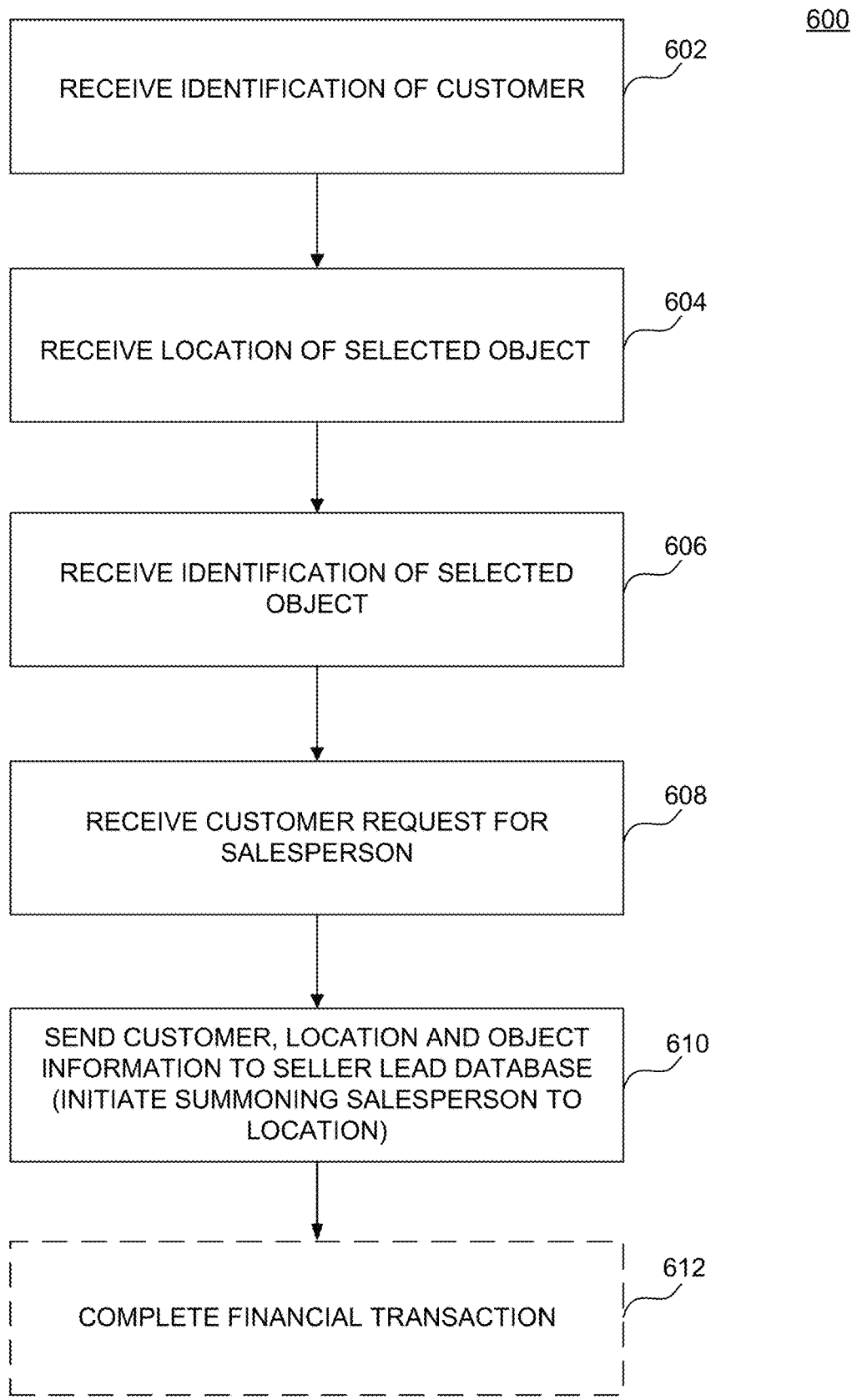
FIG. 6 depicts another flow diagram illustrating a flow of a customer shopping process, according to some embodiments.

FIG. 6 depicts a flow diagram illustrating a flow of a customer shopping process, according to some embodiments. As a non-limiting example with regards to FIGS. 1-4, one or more processes described with respect to FIG. 6 may be performed by a mobile device (e.g., mobile device 102 of FIG. 1) or a server (e.g., 107/110 of FIG. 1) for assisting a potential purchase at a location associated with a physical object that is displayed in a real-time view of the mobile device during an AR interaction. In such an embodiment, mobile device 102 and/or server 107/110 may execute code in memory to perform certain steps of method 600 of FIG. 6. While method 600 of FIG. 6 will be discussed below as being performed by mobile device 102 and/or server 107, other devices may store the code and therefore may execute method 600 by directly executing the code. Moreover, it is to be appreciated that not all steps may be needed to perform the disclosure provided herein. Further, some of the steps may be performed simultaneously or in a different order than shown in FIG. 6, as will be understood by a person of ordinary skill in the art.

In step 602, one or more platforms, servers, databases, and/or mobile devices (hereafter system) receives a customer's identification. For example, login information entered into a mobile device's communication or an augmented reality application (app) identifies the user and provides a customer ID to be sent to the one or more platforms, servers, databases as described in greater detail hereafter. In one embodiment, a customer ID is subsequently used to retrieve previously stored customer information (profile) such as identifying information (name, address) or provide a link to previously determined financing information (max loan amount, credit rating, income, etc.).

In step 604, the system receives a location of a customer-selected object (vehicle) by receiving, in part, at least a location of the customer (mobile device). For example, GPS functionality provided by locator systems of the mobile device (e.g., smartphone) are sent to the system (e.g., customer platform).

In step 606, the system receives identification of an object selected by the user. The object is identified by one or more of specific location, proximate location or visual identification applications associated with the mobile device (e.g., smartphone). For example, a vehicle located on a car storage lot is identified based on proximity to the vehicle of interest. In another example, an Augmented Reality App includes an identification by interaction with dealer inventory platforms. In yet another example, system imaging processing elements identify the object (e.g., vehicle of customer interest) as described in greater detail throughout the included embodiments. For example, a vehicle located on a car storage lot is identified based on proximity to the vehicle of interest (with 5 feet of the mobile device location).

In step 608, the system receives a request for in-person assistance sent from the mobile device to the system (e.g., dealer platform). For example, a user selects a GUI button on the display of the mobile device that transmits wirelessly a request for in-person assistance from a salesperson located on-premises in a same general location as the mobile device.

In step 610, the system sends the request for in-person assistance, transaction information, such as, but not limited to, customer information, customer location and object (vehicle) selected to a cloud-based platform, such as the dealer platform. For example, the dealer platform is an on-premises lead generator system viewable by on-site sales staff. A salesperson, receiving the request, locates the potential customer on the lot and initiates an in-person user assistance phase.

Customer information, in some embodiments, is controlled for dissemination by the user. For example, the user may select specific information to be shared or not shared and may control the timing of this sharing. In addition, metadata providing context of the user's situation (ready to buy, test-drive, etc.) may be provided to the dealer's system.

In optional step 612, the system uses the transaction information, such as customer information, financing information, and object (vehicle) identification to assist in completing a purchase transaction with the mobile device. In an alternate embodiment, the transaction information is used by the dealer to complete the purchase transaction.

Figure 7:
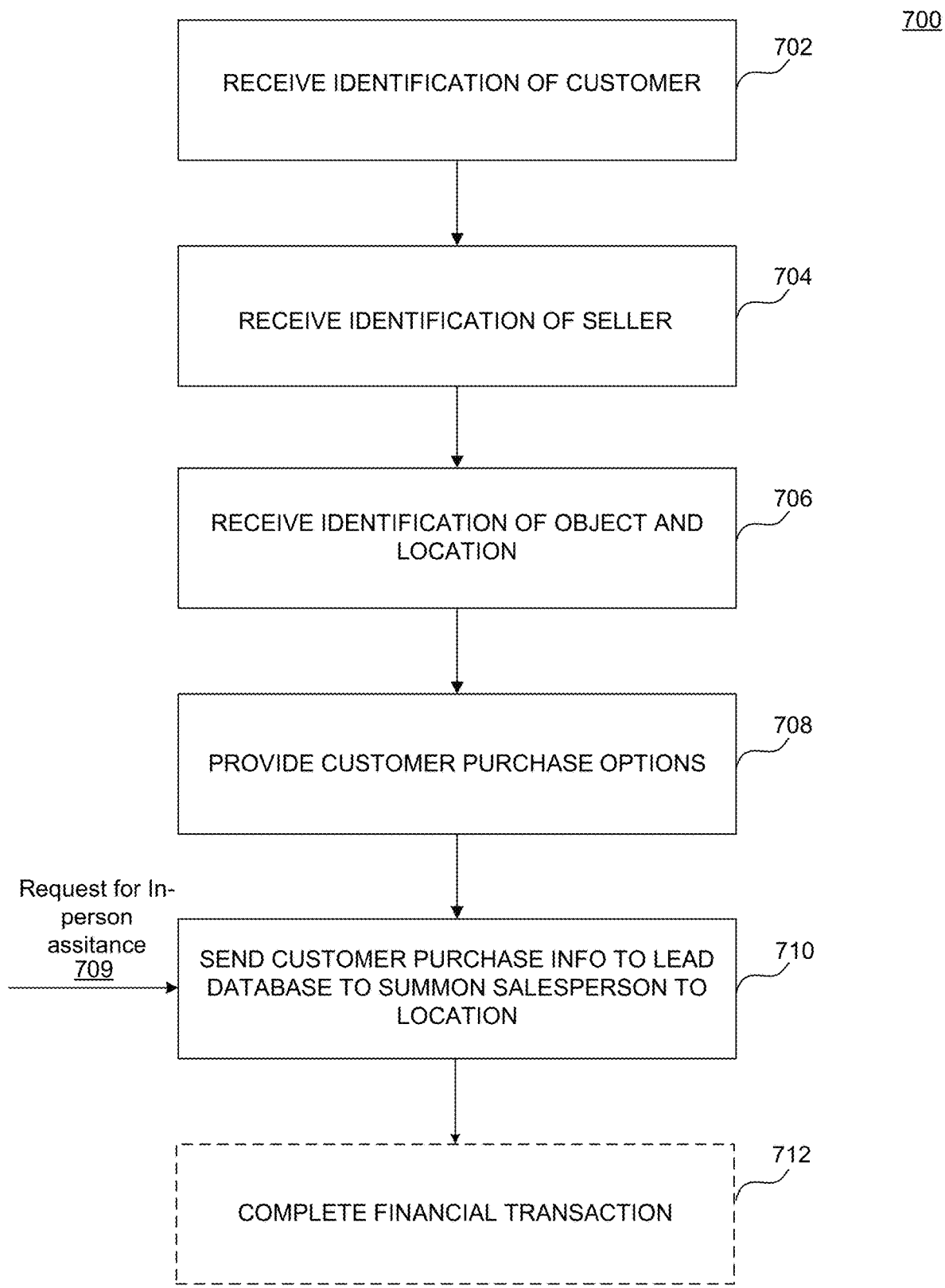
FIG. 7 depicts yet another flow diagram illustrating a flow of a customer shopping process, according to some embodiments.

FIG. 7 depicts another flow diagram illustrating a flow of a customer shopping process, according to some embodiments. As a non-limiting example with regards to FIGS. 1-4, one or more processes described with respect to FIG. 7 may be performed by a mobile device (e.g., mobile device 102 of FIG. 1) or a server (e.g., 107/110 of FIG. 1) for assisting a potential purchase at a location associated with a physical object (vehicle) that is displayed in a real-time view of the mobile device. In such an embodiment, mobile device 102 and/or server 107/110 may execute code in memory to perform certain steps of method 700 of FIG. 7. While method 700 of FIG. 7 will be discussed below as being performed by mobile device 102 and/or server 107/110, other devices may store the code and therefore may execute method 700 by directly executing the code. Moreover, it is to be appreciated that not all steps may be needed to perform the disclosure provided herein. Further, some of the steps may be performed simultaneously or in a different order than shown in FIG. 7, as will be understood by a person of ordinary skill in the art.

In step 702, one or more platforms, servers, databases, and/or mobile devices (hereafter system) receives a customer's identification. For example, login information entered into a mobile device's communication system or an augmented reality application (app) identifies the user and provides a customer ID to be sent to the one or more platforms, servers, databases as described in greater detail hereafter. In one embodiment, a customer ID is subsequently used to retrieve previously stored customer information (profile) such as identifying information (name, address) or provide a link to previously determined financing information (max loan amount, credit rating, income, etc.).

In step 704, the system receives an identification of a specific seller (e.g., dealer) associated with a general location (e.g., using geo-fencing) of a mobile device of a customer. For example, a mobile device, entering an augmented reality interaction with a vehicle on a specific dealer's storage lot, is determined to be located within a virtual geographic location that includes the specific car dealership.

In step 706, the system receives an identification (ID) of the object of interest (vehicle) selected by the user, the seller (dealer) location, and a location proximate to the customer's mobile device location. For example, a vehicle located on a car storage lot is identified based on any of, or a combination of, its dealer location, proximity to a location of a customer mobile device, distance measuring elements of the customer's mobile device or imaging object recognition software.

In another example, an augmented reality application includes an identification by interaction with image recognition platforms, seller (dealer) inventory platforms or a combination thereof. In this example, an image application displays, in a real-time view, available augmented objects that may be selected via user input and uses various image capture and measurement inputs to calculate a relative position (proximity) of the customer mobile device to the object of interest (vehicle).

In some embodiments, as part of this step, object information associated with the augmented object, such as the spatial relationship between the augmented object and other detected image objects in the real-time view, are calculated. The spatial relationship refers to an estimated virtual distance between the augmented object (where it is placed) and any other image objects.

Object information may include characteristics of the augmented object such as type, category, and name, just to name a few examples. Location information (e.g., physical or relative location) may be used to confirm that the relationship between mobile device 102 and the selected augmented object. Object information may be used to supplement that confirmation. For example, in addition to location information, the object information, such as the color or size, may be used as a means to verify the selected augmented object.

In step 708, the system provides the customer mobile device potential purchase options, such as, but not limited to, base price, price with options, dealer incentives, monthly payment, interest rate, number of months to finance, lease options, etc.

In step 709, a request for in-person assistance is received by the system. For example, it is sent from the mobile device to a seller (dealer) platform. For example, a user selects a GUI button on the display of the mobile device that requests in-person assistance from a salesperson.

In step 710, the system sends the customer's information, customer's location and object (vehicle) selected to dealer platform. For example, the dealer platform is an on-premises lead generator system viewable by on-site sales staff. A salesperson, receiving the request, locates the potential customer on the lot and initiates an in-person user assistance phase.

Customer information, in some embodiments, is controlled for dissemination by the user. For example, the user may select specific information to be shared or not shared and may control the timing of this sharing. In addition, metadata providing context of the user's situation (ready to buy, test-drive, etc.) may be provided to the dealer's system.

In optional step 712, the system uses the transaction information, such as customer information, financing information, and object (vehicle) identification to assist in completing a purchase transaction with the mobile device. In an alternate embodiment, the transaction information is used by the dealer to complete the purchase transaction.

Figure 8:
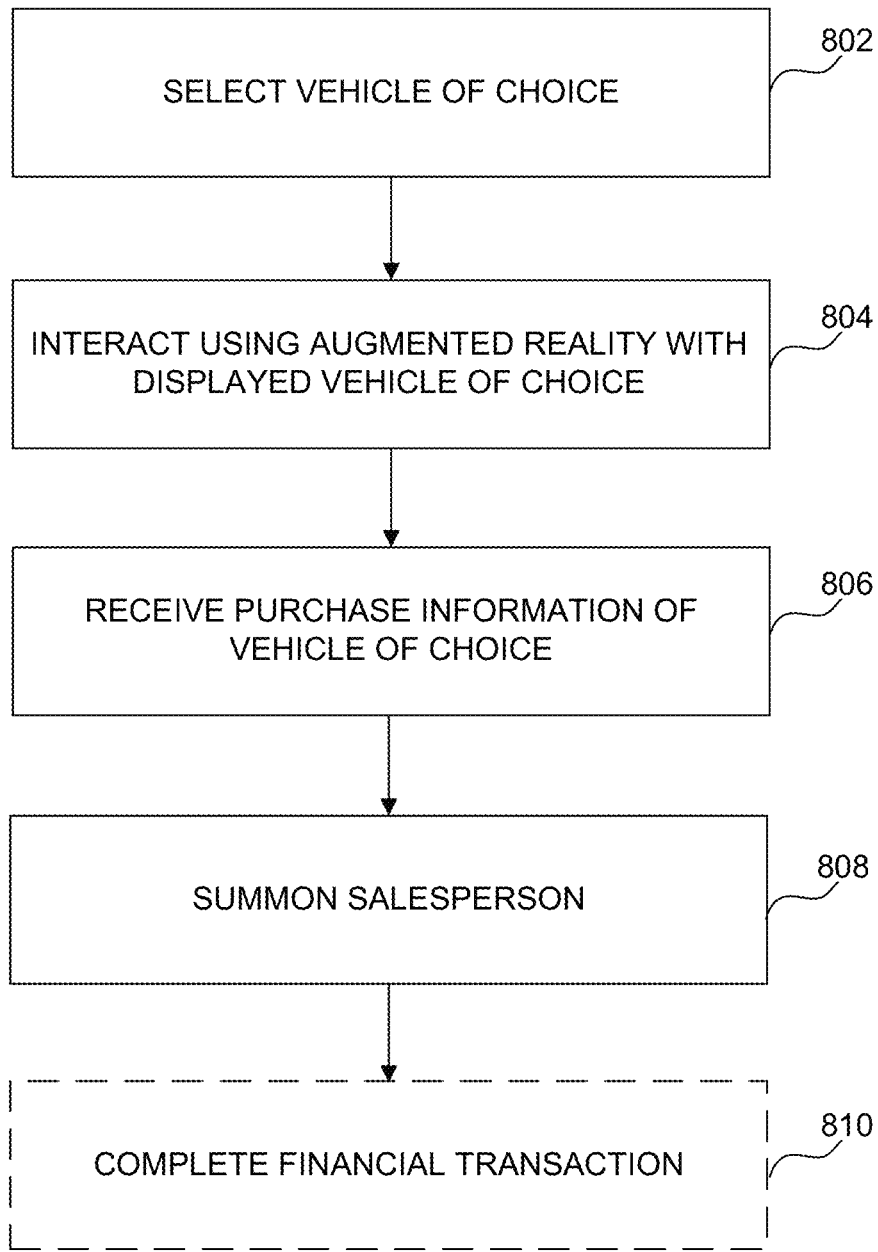
FIG. 8 depicts yet another flow diagram illustrating a flow of a customer shopping process, according to some embodiments.

FIG. 8 depicts another flow diagram illustrating a flow of a customer shopping process, according to some embodiments. As a non-limiting example with regards to FIGS. 1-4, one or more processes described with respect to FIG. 8 may be performed by a mobile device (e.g., mobile device 102 of FIG. 1) or a server (e.g., 107/110 of FIG. 1) for assisting a potential purchase at a location associated with a physical object that is displayed in a real-time view of the mobile device. In such an embodiment, mobile device 102 and/or server 107/110 may execute code in memory to perform certain steps of method 800 of FIG. 8. While method 800 of FIG. 8 will be discussed below as being performed by mobile device 102 and/or server 107/110, other devices may store the code and therefore may execute method 800 by directly executing the code. Moreover, it is to be appreciated that not all steps may be needed to perform the disclosure provided herein. Further, some of the steps may be performed simultaneously or in a different order than shown in FIG. 8, as will be understood by a person of ordinary skill in the art.

In step 802, an object is selected, for example, by a user (customer) of a mobile device visually selecting an object (e.g., vehicle) of choice located at a location (e.g., a car dealer's storage lot) by using a capture device on their mobile device. For example, the customer views the object through their display as a viewfinder.

In step 804, an augmented session is initiated. For example, the customer interacts with the selected object (vehicle) during an augmented reality session. The augmented reality interaction can be any described herein, those described by references incorporated by reference or other known or future AR processes or systems without departing from the scope of this embodiment. For example, an image application of mobile device 102 displays a real-time view of image objects that includes physical and augmented objects. The real-time view may also include one or more overlay interfaces associated with the image objects including one or more augmented objects. The overlay interfaces may allow for selection of the one or more augmented objects as well as a menu that provides access to options related to the storage location associated with each of the one or more augmented objects.

In step 806, the customer mobile device receives potential purchase options, such as, but not limited to, base price, price with options, dealer incentives, monthly payment, interest rate, number of months to finance, lease options, etc.

In step 808, a request for in-person assistance is sent from the mobile device to a dealer platform. For example, a user selects a GUI button on the display of the mobile device that requests in-person assistance from a salesperson. The request for in-person assistance, customer information, customer location and vehicle selected are sent to a cloud-based platform, such as the dealer platform. Customer information, in some embodiments, is controlled for dissemination by the user. For example, the user may select specific information to be shared or not shared and may control the timing of this sharing. In addition, metadata providing context of the user's situation (ready to buy, test-drive, etc.) may be provided to the dealer's system.

For example, the dealer platform is an on-premises lead generator system viewable by on-site sales staff. A salesperson, receiving the request, locates the potential customer on the lot and initiates an in-person user assistance phase. The potential customer receives in-person assistance based on the customer information provided to the cloud-based platform.

In optional step 810, the system uses the transaction information, such as customer information, financing information, and vehicle identification to assist in completing a purchase transaction with the mobile device. In an alternate embodiment, the transaction information is used by the dealer to complete the purchase transaction.

Figure 9:
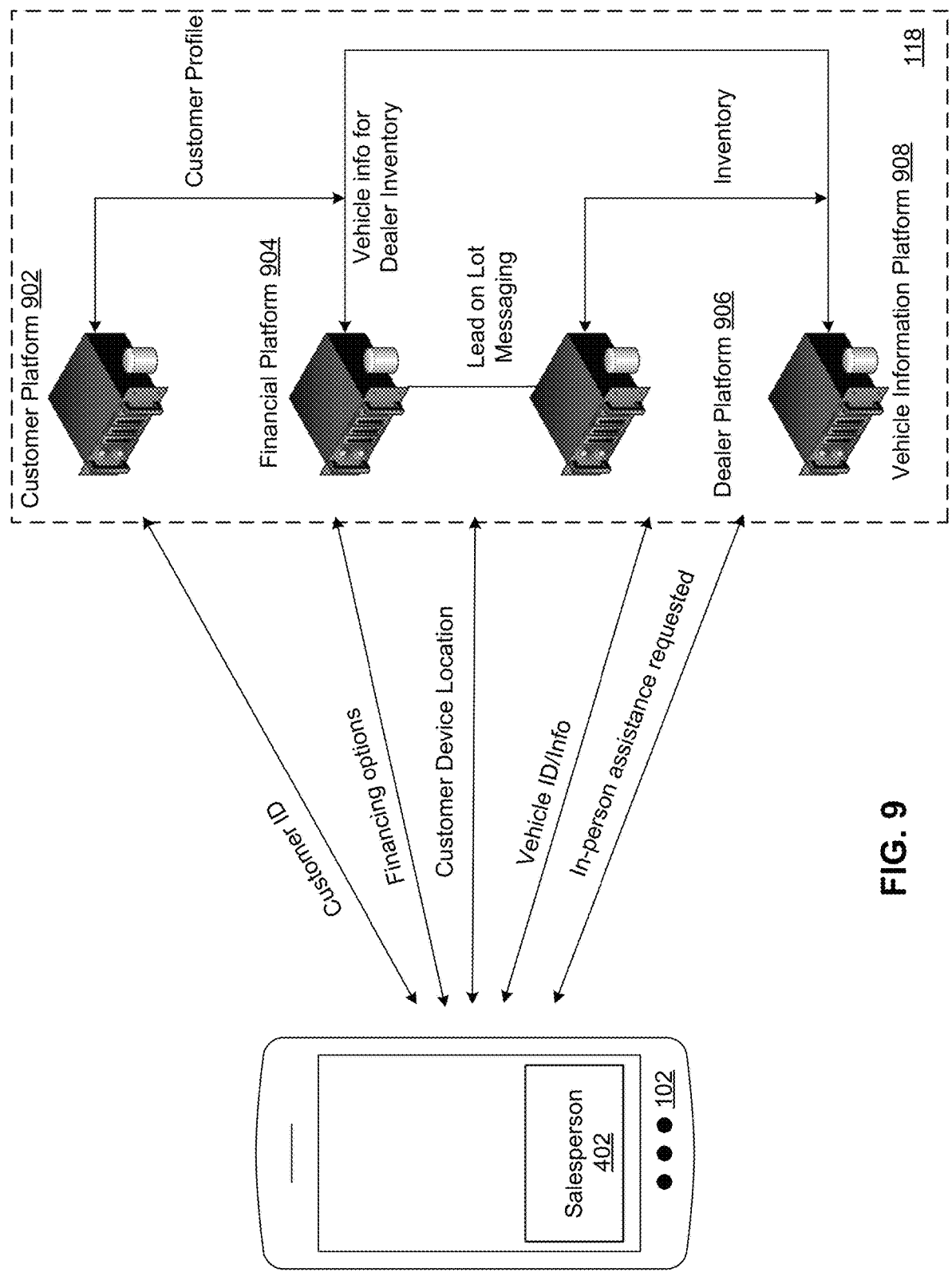
FIG. 9 depicts another flow diagram illustrating a flow of a customer shopping process, according to some embodiments.

FIG. 9 depicts another flow diagram illustrating a flow of a customer shopping process, according to some embodiments.

A flow for a shopping experience using a mobile device is shown in FIG. 9 where a mobile device 102 (FIG. 1), such as a smart phone, interacts wirelessly with one or more platforms 902-908. While shown as separate standalone platforms, one or more of the platforms can be combined or alternatively, be distributed as separate modules (e.g., a database module, an image processing module, financial module, authentication module, AR object module, object verification module, etc.). The standalone platforms can be implemented in cloud processing system 118, servers 107/110, or implemented locally on the mobile device or dealer onsite or remote computer systems without departing from the scope of the technology described herein.

As shown, a user of a mobile device 102 is identified. For example, login information is entered into a communication application, an augmented reality application (app) or financing application, etc., which identifies the user with a customer ID that is sent to any of the customer platform 902, financing platform 904, or dealer platform 906. The customer ID can enable retrieval of additional pre-stored customer profile information (name, address, etc.) from the customer platform or initiate a customer data discovery process. In addition, financing information (e.g., qualification info, credit score, etc.) can be retrieved for financing calculations by financial platform 904.

A location of the customer (mobile device) is determined. For example, GPS functionality provided by locator systems of the mobile device (e.g., smartphone) is sent to any of the customer platform 902, financing platform 904, and dealer platform 906. Location may alternatively be determined by other known or future location mechanisms. In addition, relative location of the mobile device to a proximate object of interest is determined to assist in identifying the object for further processing. In one example, a mobile phone's location is determined and subsequently a vehicle displayed in a real-time screen image obtained by a smartphone camera is captured and sent to vehicle information platform 908. Once identified, a vehicle ID can be used to compare against existing vehicle inventory to identify a specific vehicle and associated vehicle information, such as, descriptive information (color, 2 door, 4 door, etc.), features, installed options, dealer pricing, etc. The vehicle ID and associated information is fed to the dealer platform to assist in identifying the specific vehicle and a possible dealer lot location (e.g., dealership 1, lot 2, and row 2). The vehicle ID and associated information is also fed to the financial platform to assist in identifying possible financing options based, at least partially, on the customer data and the vehicle information. Other information, such as dealer promotions, manufacturer promotions, lease promotions, dealer sales goals, size or age of inventory, etc. may also be fed from the dealer platform to the financial platform to be used to provide additional financing options.

The object (vehicle) selected by the user, is identified by one or more of specific location, proximate location or visual identification applications associated with the mobile device (e.g., smartphone) or separately by remote server processing. For example, a vehicle located on a car storage lot is identified based on proximity to the vehicle of interest. In another example, an Augmented Reality App includes an identification by interaction with dealer inventory platforms.

A request for in-person assistance is sent from the mobile device to a dealer platform. For example, a user selects a GUI button 402 on the display of the mobile device that requests in-person assistance from a salesperson. The request may receive an acknowledgement message from the dealer platform. Dealer platform 906 may, in one embodiment, include a lead generation system that receives the in-person assistance request. In addition, the response to the request for in-person assistance may include customer information, financing information, customer location (mobile device) and vehicle selected as provided by platforms 902-908. For example, the dealer platform is an on-premises lead generator system viewable by on-site sales staff.

Customer information, in some embodiments, is controlled for dissemination by the user. For example, the user may select specific information to be shared or not shared and may control the timing of this sharing. In addition, metadata providing context of the user's situation (ready to buy, test-drive, etc.) may be provided to the dealer's system.

A salesperson, receiving the request and additional customer, financing and vehicle information. The salesperson locates the potential customer on the lot and initiates an in-person user assistance phase. Additional financing/purchase operations needed to complete the purchase transaction can be processed locally on the mobile device or remotely on the financial platform 904 or dealer platform 906.

Figure 10:
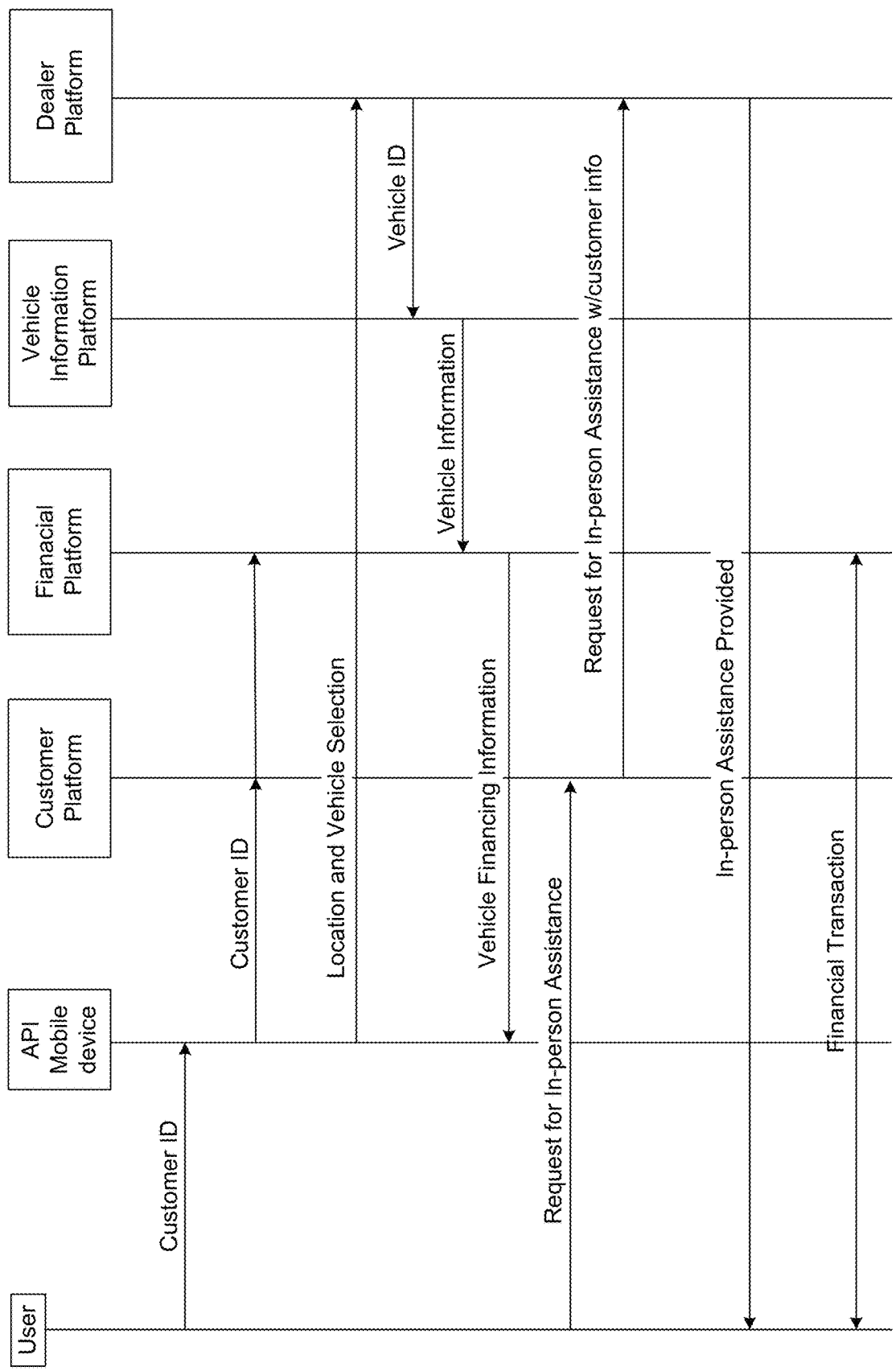
FIG. 10 depicts a timing diagram illustrating a flow of a customer shopping process, according to some embodiments.

FIG. 10 depicts a timing diagram illustrating a flow of a customer shopping process, according to some embodiments.

First, a user (customer) of a mobile device is identified. For example, login information provided through an application programming interface (API) identifies the user (customer ID). The API is software that allows two applications to talk to each other. The customer ID is provided to both a customer platform and a financial platform. For example, login information is entered into a user interface (UI) communication application, an augmented reality application (app) or financing application, etc., which identifies the user with a customer ID that is sent to any of the customer platform 902 and financing platform 904. The customer ID can enable retrieval of additional pre-stored customer profile information (name, address, etc.) from the customer platform or initiate a customer data discovery process. In addition, financing information (e.g., qualification info, credit score, etc.) can be retrieved for financing calculations by financial platform 904.

Next, a location of the customer (mobile device) is determined. For example, GPS functionality provided by locator systems of the mobile device (e.g., smartphone) is sent to any of the customer platform 902, financing platform 904, and dealer platform 906. Location can alternatively be determined by other known or future location mechanisms. In addition, relative location of the mobile device to a proximate object of interest is determined to assist in identifying the object for further processing. In one example, a mobile phone's location is determined and a vehicle displayed in a real-time screen image obtained by a smartphone camera is captured and sent to vehicle information platform 908. Once identified, a vehicle ID can be used to compare against existing vehicle inventory to identify a specific vehicle and associated vehicle information, such as, descriptive information (color, 2 door, 4 door, etc.), features, installed options, dealer pricing, etc. The vehicle ID and associated information is fed to the dealer platform to assist in identifying the specific vehicle and a possible dealer lot location (e.g., dealership 1, lot 2, and row 2). The vehicle ID and associated information is also fed to the financial platform to assist in identifying possible financing options based, at least partially, on the customer data and the vehicle information. Other information, such as dealer promotions, manufacturer promotions, lease promotions, dealer sales goals, size or age of inventory, etc. may also be fed from the dealer platform to the financial platform to be used to provide additional financing options.

Next an object (vehicle) selected by the user, is identified by one or more of specific location, proximate location or visual identification applications associated with the mobile device (e.g., smartphone) or separately by remote server processing. For example, a vehicle located on a car storage lot is identified (Vehicle ID) based on proximity to the vehicle of interest. In another example, an Augmented Reality App includes an identification by interaction with dealer inventory platforms. The vehicle ID is sent to the vehicle information platform to identify a specific vehicle and its associated information.

Next, the vehicle information is provided to the financial platform to assist in determining financing options for the specific vehicle.

Next, the financing options are provided back to the user (mobile device) so that the customer can make a decision to purchase. Based on this decision, the customer requests for in-person assistance using the mobile device. For example, a user selects a GUI button on the display of the mobile device that requests in-person assistance from a salesperson. The request may receive an acknowledgement message from the dealer platform. Dealer platform 906 may, in one embodiment, include a lead generation system that receives the in-person assistance request.

Next, in response to the request for in-person assistance purchase information, such as, customer information, financing information, customer location (mobile device) and vehicle selected as provided with the request to the dealer platform. For example, the dealer platform is an on-premises lead generator system viewable by on-site sales staff. A salesperson, receiving the request and additional customer, financing and vehicle information. The salesperson locates the potential customer on the lot and initiates an in-person user assistance phase. Customer information, in some embodiments, is controlled for dissemination by the user. For example, the user may select specific information to be shared or not shared and may control the timing of this sharing. In addition, metadata providing context of the user's situation (ready to buy, test-drive, etc.) may be provided to the dealer's system.

Lastly, financing/purchase operations needed to complete the purchase transaction can be processed locally on the mobile device or remotely on the financial platform 904 or dealer platform 906.

While described in a specific timing order, variations in timing or order of steps, variations in data destinations or originations, are considered within the scope of the instant technology described herein.

Figure 11:
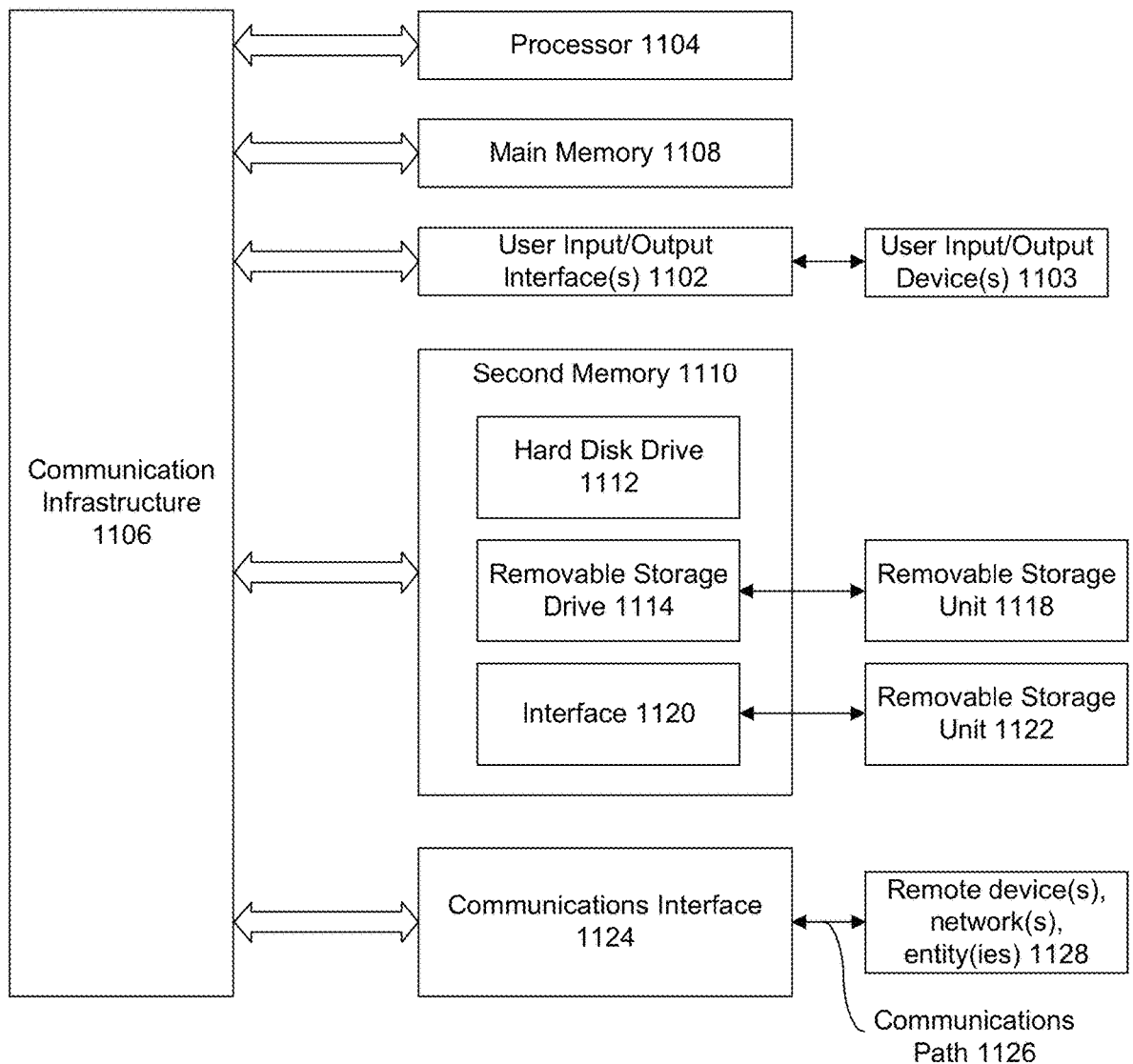
FIG. 11 depicts an example computer system useful for implementing various embodiments.

Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof. Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
identifying, by a mobile device, a user of the mobile device;
identifying, by the mobile device, a location of the mobile device;
capturing, by the mobile device, one or more images of a physical object selected by the user, wherein the mobile device is configured with a plurality of differing camera lenses to acquire object information associated with the physical objects in real time, wherein the object information comprises any of: a depth of field, a position of the physical object relative to another physical object, or three-dimensional contour information;
identifying, by the mobile device, the physical object selected by the user, wherein the physical object is located at a geographic location proximate to the location of the mobile device, and wherein the physical object is identified as a current inventory item based on a comparison of the object information, the location of the mobile device and the one or more images to inventory object information, the geographic location and imagery of one or more inventory items stored in a digital record in a remote inventory server;
receiving, on a user interface (UI) of the mobile device and based on the digital record of the current inventory item, graphics comprising at least a description of the current inventory item;
receiving, on the user interface of the mobile device, a request from the user for in-person assistance;
providing, to a cloud-based platform, user information, wherein the user information includes the identification of the user of the mobile device, the location of the mobile device and an identity of the digital record of the physical object selected by the user, wherein the the digital record includes at least the description of the current inventory item; and
wherein the user receives in-person assistance based on the user information provided to the cloud-based platform.

2. The method of claim 1, further comprises interacting with the physical object selected by the user using the UI that includes an augmented reality (AR) interface.

3. The method of claim 2, wherein the augmented reality (AR) interface identifies one or more features of the physical object selected by the user.

4. The method of claim 1, wherein the physical object selected by the user is a vehicle.

5. The method of claim 4, wherein the cloud-based platform is a vehicle dealer platform.

6. The method of claim 5, wherein the vehicle dealer platform is a vehicle dealer lead generation system.

7. The method of claim 4, wherein the location of the mobile device is proximate to a specific vehicle located at a vehicle dealer storage lot.

8. The method of claim 1, wherein the mobile device is any of: a smartphone, tablet, or wearable computer.

9. The method of claim 1, further comprises providing, to the mobile device, financing information at least partially based on the physical object selected by the user.

10. The method of claim 9, further comprises, based on the financing information, completing a transaction with the mobile device.

11. A method comprising:
identifying a user of a mobile device;
identifying a location of the mobile device;
capturing, by the mobile device, one or more images of a physical object selected by the user, wherein the mobile device is configured with a plurality of differing camera lenses to acquire object information associated with the physical object comprising in real time, wherein the object information comprises any of: depth of field, a position of the physical object relative to another physical object, or three-dimensional contour information;
identifying the physical object selected by the user of the mobile device based, at least in part, on the object information, wherein the physical object selected is proximate to the location of the mobile device, and wherein the physical object is identified as a current inventory item based on a comparison of the object information, the location of the mobile device and the one or more images to inventory object information, an inventory item geographic location and imagery of one or more inventory items stored in a digital record of a remote inventory server;
receiving, on a user interface (UI) of the mobile device and based the digital record of the current inventory item, graphics comprising at least a description of the current inventory item;
receiving, on the user interface, a request for in-person assistance from the user of the mobile device;
providing, to a cloud-based platform serving the current inventory item, user information, wherein the user information includes one or more of: the identification of the user of a mobile device, the location of the mobile device and the digital record of the identified physical object selected by the user, wherein the digital record includes at least the description of the current inventory item; and
wherein the user receives in-person assistance based on the user information provided to the cloud-based platform.

12. The method of claim 11, further comprises interacting with the physical object selected by the user using the UI that includes an augmented reality (AR) interface to interact with the physical object selected by the user.

13. The method of claim 12, wherein the augmented reality (AR) interface identifies one or more features of the physical object selected by the user.

14. The method of claim 11, wherein the physical object selected by the user is a vehicle and the location is proximate to a specific vehicle located at a storage lot associated with the identified cloud-based platform.

15. The method of claim 11, wherein the mobile device is any of: a smartphone, tablet, or wearable computer.

16. The method of claim 11, further comprises providing, to the mobile device, financing information at least partially based on the physical object selected by the customer.

17. The method of claim 16, further comprises, based on the financing information, completing a transaction with the mobile device.

18. A system, comprising:
a memory; and
one or more processors configured to:
   identify a user of a mobile device;
   identify a location of the mobile device;
   capture, by the mobile device, one or more images of a physical object selected by the user, wherein the mobile device is configured with a plurality of differing camera lenses to acquire object information associated with the physical object in real time, wherein the object information comprises any of: depth of field, a position of the physical object relative to another physical object, or three-dimensional contour information;
   identify the physical object selected by the user of a mobile device based, at least in part, on the object information, wherein the physical object is proximate to the location of the mobile device, and wherein the physical object is identified as a current inventory item based on a comparison of the object information, the location of the mobile device and the one or more images to inventory object information, an inventory item geographic location and imagery of one or more inventory items stored as a digital record in a remote inventory server;
   receive, on a user interface (UI) of the mobile device and based on a match of the location of the mobile device and the geographic location of the current inventory item, graphics comprising at least a description of the current inventory item;
   receive, on the user interface, a request for in-person assistance;
   provide, to a cloud-based platform serving the location of the mobile device, user information, wherein the user information includes one or more of: the identification of the user, the location of the mobile device and the identified physical object selected by the user of the mobile device, wherein the digital record includes at least the description of the current inventory item; and
   wherein the user receives in-person assistance based on the user information provided to the cloud-based platform.

19. The system of claim 18, further comprises interacting with the physical object selected by the user using the UI that includes an augmented reality (AR) interface to interact with the physical object selected by the user.

20. The system of claim 18, wherein the physical object selected by the user is a vehicle, the cloud-based platform is a vehicle dealer platform and the location is proximate to a specific vehicle located at a vehicle dealer storage lot.

* * * * *